United States Patent [19]

Best et al.

[11] Patent Number: 5,283,276
[45] Date of Patent: Feb. 1, 1994

[54] COATING COMPOSITIONS

[75] Inventors: Robert D. M. Best, Redcar, United Kingdom; Pierre H. Fillastre, Rouen; Edouard M. Mathieu, Mont-Saint-Aignan, both of France

[73] Assignee: Exxon Chemical Patents Inc., Linden, N.J.

[21] Appl. No.: 778,855

[22] PCT Filed: Jun. 25, 1990

[86] PCT No.: PCT/GB90/00978
§ 371 Date: Feb. 19, 1992
§ 102(e) Date: Feb. 19, 1992

[87] PCT Pub. No.: WO91/00319
PCT Pub. Date: Jan. 10, 1991

[30] Foreign Application Priority Data

Jun. 26, 1989 [GB] United Kingdom ............... 8914674
Feb. 16, 1990 [GB] United Kingdom ............... 9003536

[51] Int. Cl.$^5$ .............................................. C08K 5/42
[52] U.S. Cl. ........................................ 524/166; 524/161
[58] Field of Search ............................. 524/166, 161

[56] References Cited

U.S. PATENT DOCUMENTS 2,490,264 12/1949 Garber ............................... 524/166
3,453,124  7/1969 Wurstner ........................... 524/166
3,565,843  2/1971 Kassinger ......................... 524/166

Primary Examiner—Paul R. Michl
Assistant Examiner—John J. Guarriello

[57] ABSTRACT

A corrosion protection composition a dispersion or solution of (a) colloidal size amorphous overbased sulfonate, (b) solvent or plasticizer, and (c) polymeric material soluble in the solvent or compatible with the plasticizer is disclosed. The composition comprises at least about 70% solids, by weight, and the particle size if the colloidal overbased sulfonate is up to about 100 A. Preferably, the composition is free from any mineral oil. Metal surfaces having the herein disclosed composition applied thereto, or having the applied thereto the composition from which the solvent has been removed also is disclosed.

13 Claims, No Drawings

COATING COMPOSITIONS

The present invention relates to compositions and their use as coating materials particularly for the undercoating of motor vehicles to prevent chipping and corrosion.

Automobile undercoatings typically consist of several layers on a metal, usually phosphorised metal. First the phosphorised metal is painted, it is subsequently coated with a layer of a polyvinyl chloride plastisol, generally applied as a dispersion, which is fused to provide a rendered chip resistant coating. Frequently the plastisol is filled with a substantial amount of filler, typically calcium carbonate. Once the polyvinyl chloride layer is applied it may itself be coated with a layer of wax to inhibit decomposition of the polyvinyl chloride and consequential corrosion. There may also be incorporated an anticorrosion material which may include a thixotropic calcium sulphonate, but the sulphonate cannot be incorporated into the polyvinyl chloride because of the incompatibility of the plasticizer of the plastisol with large quantities of oil, which are normally present in the calcium sulphonate materials.

These coating systems are complex and furthermore there is a desire to replace the polyvinyl chloride to avoid toxicological problems in the disposal of vehicles by combustion. The need to fill the polyvinyl chloride to obtain the viscosity and abrasion resistant characteristics necessary for application and fusion of the coating also requires that relatively thick and heavy layers be used. Apart from the expense of a thick layer, this is undesirable given the general desire to reduce the vehicle weight.

The polyvinyl chloride layer furthermore provides very limited anticorrosion properties and its flexibility under changing temperature and stress conditions can be unsatisfactory.

Various alternative coating compositions have been tried but have not proved satisfactory since they do not satisfy one or more of the requirements, particularly the ability to be applied as a solution or dispersion which can give a coating with sufficient adhesion to metal, which does not sag and which has sufficient temperature and stress endurance. It is also desirable to have a coating that can be applied at a high solids level by the preferred spraying techniques at ambient temperature so reducing the amount of solvent used and facilitating its removal. Furthermore, it would be highly desirable to have a single treatment which provides both anticorrosion and chip resistance to the underside of the vehicle.

Numerous coating compositions have been proposed, many of which have been used commercially, for the coating of ferrous and non-ferrous metals susceptible to rust or corrosion, to prevent or inhibit such rust or corrosion. As has long been known, rust or corrosion is caused by environmental conditions, such as contact of the metal surfaces with water and oxygen; by air, particularly moist air; and by various chemicals or other materials which come into contact with the metal surfaces.

While, in most cases, ferrous metals such as iron and steels represent the areas where rust and corrosion problems are particularly encountered, various non-ferrous metals, for instance, aluminium, are also subject to corrosion.

The use of corrosion-inhibiting coating compositions, which contain thixotropic, or grease-like or gel-like thixotropic, alkaline earth metal organic sulphonates complexed with alkaline earth metal carbonates, with or without admixture with polymers, resins or waxes, in a carrier or diluent of nonvolatile or volatile (or mixtures of nonvolatile and volatile) hydrocarbons and/or other liquid solvents, is disclosed in U.S. Pat. Nos. 3,453,124; 3,492,231; 3,565,672; 3,565,843; 3,661,662; 3,746,643; and 3,816,310; and United Kingdom Patent No. 1,249,144 and various patents referred to in the specifications of such patents. Various of such corrosion-inhibiting compositions are proposed for a variety of purposes, some including automobile and truck body undercoatings, and others for use in other environments.

A typical sprayable composition has approximately 50% solids content, the solvent usually being a light hydrocarbon. For environmental reasons, it is desirable to reduce the solvent content, and there remains a need for corrosion-inhibiting compositions that are obtainable as solutions with higher solids content, but which may be sprayed from currently used equipment. The composition should retain the ability to produce a finished coating that affords adequate corrosion protection, with satisfactory adhesion to the metal to which it is to be applied, water and chemical resistance, and absence of sagging or dripping at elevated temperatures. Further the composition should be capable of being formulated as a hard, paint-like, coating, an elastomeric coating, or a soft coating, e.g., the waxy coatings applied to internal surfaces of motor vehicles.

The present invention is based on the observation that a composition comprising a colloidal overbased amorphous alkaline earth metal sulphonate and a suitable polymer is capable of being applied, for example, by spraying at high solids contents.

The present invention accordingly provides a composition comprising
(a) a colloidal overbased amorphous sulphonate of an alkaline earth metal or magnesium, with a particle size of at most 100 A,
(b) a solvent or a plasticizer, and
(c) a polymeric material soluble in the solvent or compatible with the plasticizer.

The composition advantageously has a solids content of at least 70% by weight, and preferably has a solids content of up to 85% by weight. Of the solids content, the colloidal sulphonate advantageously represents from 75 to 99.9% with the polymer and any plasticizer present representing from 0.1 to 25%; preferably the proportions are 80 to 99.8% and 0.2 to 20%.

The invention also provides metal surfaces having the composition applied thereto, or having applied thereto the composition from which the solvent has been removed. The invention further provides the use of the composition as a coating composition for a metal or other surface subject to corrosion.

The alkaline earth metal is advantageously calcium and, for simplicity of description, the preparation and properties of component (a) will be described with reference to the calcium salt, although overbased magnesium sulphonates may also be used, either alone or in admixture with a calcium salt. Magnesium based compositions have especial utility where the treated surface is exposed to acidic atmospheres, although compositions based on magnesium alone are not so suitable where abrasion resistance is important. Zinc salts may also be used in admixture with calcium and/or magnesium. The term "overbased" is descriptive of compositions containing an excess of metal over that stoichiometrically required to neutralize the acid dispersing agent, in the present case a sulphonic acid.

Many processes for preparing dispersions of calcium salts involve carbonation of calcium oxide, hydroxide or alkoxide in an organic solvent in the presence of a sulphonic acid or other dispersant and, although carbonate is the predominant anion in the product, the original anions may remain. Calcium carbonate exists in various forms, and it has been found that, for the composition to have the desired properties, the component (a) should be substantially free of calcite and Vaterite as determined by infra-red analysis (calcite 884 $cm^{-1}$; vaterite 879 $cm^{-1}$), and show a strong absorbance at 860 $cm^{-1}$ (amorphous).

The particle size of the overbased calcium sulphonate is as indicated above at most 100 A, and is advantageously in the range 25 to 75 A, preferably about 50 A, the values including the core and surrounding sulphonate layer. Processes for the preparation of material of appropriate properties and particle size are described in our co-pending British Patent Application No. 89.14674.0, which has been abandoned in favor of European Patent Application No. 90-306909.4, filed Jun. 25, 1990; and in our Application Case No. 89MET002 (Ser. No. 778,856, filed Feb. 19, 1992), filed simultaneously with the present application, the disclosures of both of which are incorporated by reference herein, and a preferred process will be described in more detail in Example A below.

A preferred process comprises forming a substantially mineral oil free mixture of a sulphonic acid and/or an alkaline earth metal sulphonate, a hydrocarbon solvent, an alcohol containing from 1 to 5 carbon atoms and an excess, relative to the acid, of calcium hydroxide or calcium oxide and water, carbonating the mixture at a temperature of at most 60° C., and advantageously of at most 35° C., removing the residual alcohol, optionally adding the medium, other than oil, in which it is desired to obtain the basic calcium sulphonate, removing the hydrocarbon solvent and optionally removing any water present.

The term "sulphonic acid or sulphonate", as used herein, refers generally to those sulphonates wherein the hydrocarbon portion of the molecule has a molecular weight in the range of about 300 to about 1,200. Preferably, for calcium sulphonate where one molecule contains sulphonate groups, this molecular weight is in the range of about 900 to about 1,100. These sulphonic acids or sulphonates may be either synthetic sulphonates or the so-called mahogany or natural sulphonates. The term "synthetic sulphonates" refers to those sulphonates which are derived from sulphonation feedstocks which are prepared synthetically. The synthetic sulphonates include alkyl sulphonates and alkaryl sulphonates. The alkaryl radical can be derived from benzene, toluene, ethyl benzene, xylene isomers, or naphthalene. Preferably, the alkyl groups are branched chain. Mixtures of sulphonates derived from alkaryl hydrocarbons having straight-chain alkyl groups and alkaryl hydrocarbons having branched-chain alkyl groups are particularly useful.

An example of still another synthetic alkaryl sulphonate, which is particularly useful for preparing colloidal dispersions, is the sulphonate derived from a sulphonation feedstock known as "NAB Bottoms". NAB Bottoms are predominantly di-n-alkyl, wherein the alkyl groups contain from eight to 18 carbon atoms. They are distinguished from the preceding sulphonation feedstocks primarily in that they are straight-chain and contain a large amount of di-substituted material.

Other sulphonates which can be used include, for example, mono- and poly-wax substituted naphthalene sulphonates, dinonyl naphthalene sulphonates, naphthalene disulphide sulphonates, dicetyl thianthrene sulphonates, dilauryl $\beta$-naphthol sulphonates, unsaturated paraffin wax sulphonates, hydroxy substituted paraffin wax sulphonates, cyclo-aliphatic sulphonates, such as laurylcyclohexyl sulphonates, and mono- and poly-wax substituted cyclohexyl sulphonates.

Carbonation of the sulphonate is generally carried out until absorption of at least about 80%, and advantageously at most about 90%, preferably from 85 to 90%, of the stoichiometric quantity of $CO_2$ needed to convert all calcium hydroxide to carbonate; by this control, an amorphous core is obtained. The amorphous nature of the carbonate contributes to the fluidity at low temperature of the dispersion and also to adhesion to metal coatings of the polymer-containing composition.

If component (b) is a solvent, there is advantageously used a hydrocarbon solvent, and more especially a solvent free from aromatic materials. Preferably the solvent is aliphatic.

As preferred solvents, there may be mentioned hexane, heptane, mixtures of straight chain alkanes with from 5 to 15 carbon atoms, branched chain alkanes, e.g., isohexane, and hydrogenated naphthalenes, and EXXSOL D40. Among the presently less preferred aromatic hydrocarbon solvents there may be mentioned toluene, xylene, and Solvesso 100.

Where component (b) is a plasticizer, it may be, for example, dioctyl phthalate, dinonyl phthalate, and corresponding adipates and pyromellitates.

The proportion of solvent is chosen with a view to ensuring that the viscosity of the composition is appropriate for application by the chosen method. For example, for atomized or airless spraying, a viscosity in the range 10 to 1000, advantageously 15 to 500, and preferably 20 to 400, Pa s at 23° C., is appropriate.

If warm spraying is under consideration, at a few degrees below the flash point of the solvent, then similar viscosity ranges at the relevant temperature will be appropriate.

As the polymeric material, there may be mentioned, especially, film forming polymers, and more especially those used as binders in coating compositions or paints. Preferably the polymer is soluble in component (b), and is most preferably soluble in aliphatic solvents generally. Preferred polymers have a low degree of crystallinity, and a molecular weight in the range of from 3000 to 1000000. An appropriate combination of components (b) and (c) is a film-forming system comprising the polymer and the plasticizer or solvent, or the plasticizer and solvent, the compositions wetting the surface to be treated. Preferred among such polymers are polyesters, especially rosin esters; acrylic resins, thermoplastic polyamides, and ethylene-based copolymers, for example copolymers of ethylene and unsaturated acids, e.g., acrylic and methacrylic acids, or of ethylene and unsaturated esters, e.g., vinyl acetate and especially ethylene/unsaturated carboxylic acid/additional monomer (preferably an unsaturated ester of carboxylic acid) terpolymers. As examples of dimerized rosin esters, there may be mentioned pentaerythritol rosin esters, having melting points between 105° C. and 140° C., available commercially, for example, from Oulatac Corp. under the trade mark OULATAC 105. A suitable acrylic resin has a molecular weight within the range of from 50,000 to 150,000, and a glass transition temperature of from 10° to 55° C., e.g., that available from ICI under the trade mark Neocryl B731.

As the polyamide there may be mentioned the solid thermoplastic reaction product of a dimer acid with a diamine, and that available commercially under the trade mark Genamid 2000, a low viscosity (~2000 cS at 23° C.) liquid with an amine value (mg KOH/g) of about 600.

As the terpolymer, the incorporation of which confers a degree of elasticity on the composition, there is preferably used a copolymer containing 50 to 99 wt. % ethylene, 1 to 20 wt. % unsaturated carboxylic acid, preferably acrylic acid, methacrylic acid or maleic acid, and 1 to 30 wt. % of an ester comonomer.

Advantageously, the copolymer has a Brookfield viscosity at 190° C. of from 100 to 10000 mPa s and a number average molecular weight of from 1000 to 10000. The preferred copolymer has a Brookfield viscosity at 190° C. of from 300 to 3000 mPa s, a number average molecular weight of from 4000 to 8000, an unsaturated carboxylic acid content of from 5 to 15 wt. % and an ester comonomer content of from 10 to 20 wt %.

The preferred unsaturated carboxylic acid is acrylic acid and the preferred ester is vinyl acetate. The most preferred terpolymer is one having 7% of acrylic acid and 17% vinyl acetate by weight, and a viscosity of 2700 mPa s at 190° C.

If desired, the acid moiety may be neutralized, for example, by a low molecular weight amine, for example a polyethylene polyamine, or a monovalent metal ion.

The compositions of the invention may be in the form of solutions containing greater than 70 wt. % solids, typically 70 to 85 wt. % solids, and these solutions may be applied by conventional techniques to provide effective anti-corrosion and chip protection for metals, and such a use is part of the present invention as are metals coated with the composition. In particular, it is found that effective coatings of a thickness as low as 100 $\mu$m or even lower may be produced.

The viscosity and flexibility of the compositions of the present invention, their adhesion to metal, and their hardness and thus resistance to chipping, may be controlled by the inclusion of other components in the composition such, for example, as petroleum and terpene resins, soaps which may be salts of oxidized paraffinic waxes, and alkenyl succinic anhydrides and esters thereof. The properties of the composition may also be controlled by chemical means such as cross-linking with peroxides, amines or anhydrides.

The alkenyl succinic acid is advantageously one having a chain length of from 9 to 20 carbon atoms. Its presence contributes to accelerating the setting time of the composition and subsequent hardness and adhesion at temperatures above 140° C.

In addition to the optional components mentioned above, the composition may also comprise fillers or pigments, for example calcium carbonate, titanium dioxide or carbon black.

An especially useful composition may be formed by incorporating a fluffy reinforcing grade carbon black of low pH into the composition at a level, for example, of up to 40 parts by weight per 100 parts of basic sulphonate by, for example, ball milling for an extended period. In this way, high concentrations of reinforcing filler may be incorporated without introducing structure into the composition that would interfere with Newtonian behaviour. As an example, Cabot Mogul L reinforcing black, particle size 270 A of pH 3 was introduced at a level of 35 parts per 100 sulphonate by ball milling overnight.

Because of the small particle size of the overbased sulphonate in the invention, the product has a clear color which makes it possible, where a paint is being formulated, to have a reduced pigment content.

The compositions of the invention have utility in the automotive industry, as anticorrosion coatings, e.g., underbody or interior body coatings, as well as outside that industry, e.g., as industrial and marine paints. The compositions of the invention have good adhesion to iron and steel surfaces, including zinc coated surfaces and surfaces bearing an electrodeposited coating of, e.g., epoxy, polyester, polyurethanes, or blends of two or more such materials.

In the compositions described in the following numbered examples, which illustrate the invention, no fillers, pigments or other additives common in the art have been included, so that the properties of the basic compositions themselves may be studied. Example A illustrates a preferred method of preparing the basic calcium sulphonate.

EXAMPLE A

To a stirred mixture of 276 g of calcium oxide in 585 g of toluene, there is added 494 g of an alkyl (alkyl chain—a mixture of about 75% $C_{24}$ branched and 25% $C_{18}$ linear alkyl groups) benzene sulphonic acid over a period of 0.5 hours at room temperature. To this mixture, there are added 585 g of methanol and 17.5 g of water. The mixture is then blown with 126 g of carbon dioxide for 4 hours at a temperature close to 28° C. The mixture is then heated to 68° C. over 2.5 hours to complete the reaction and remove methanol, before adding 200 g of EXXSOL D 40, an aliphatic hydrocarbon solvent. The resulting mixture is heated to 140°–150° C. for one hour to remove toluene and water before filtration.

The resulting product is a solution of basic calcium sulphonate in EXXSOL D 40, which solution contains 80% of non-volatile materials, 14.5% calcium, and has a viscosity of 400 mPa s at 23° C., this viscosity being constant to ±10% under different shear rates as measured through the Brookfield viscosimeter, evidencing the Newtonian behaviour of the product. The product has ASTM D 1500 color of 8; a 25% by weight solution in toluene has a Gardner rating of 10. Infra-red spectroscopy shows that the calcium carbonate dispersed in this product is amorphous. Light scattering techniques indicate that the colloid particle size is around 50A.

This product by itself is capable of forming a continuous protective film on metal surfaces, the small size of its particles enabling it to cover all the micro asperities of the surface, the film being thermally stable up to 180° C. The addition of a polymer supplies the required mechanical properties.

EXAMPLES 1 TO 3

The following compositions have been blended and applied on Parkerised mild steel test panels at 200 and 500 $\mu$m, and allowed to air dry for 3 days at room temperature.

|  | Ex. 1 | Ex. 2 | Ex. 3 |
|---|---|---|---|
| Product from Ex. A (parts) | 100 | 100 | 100 |
| OULATAC 105 (parts) | 16 | 32 | 40 |
| Solvesso* 100 (parts) | 4 | 8 | 10 |
| Total solid content (%) | 80 | 80 | 80 |
| Viscosity at 23° C. (Pa s) | 60 | 400 |  |

*An aromatic white spirit

These coatings were satisfactory for film hardness and anti-sagging performance but were brittle at −20° C. Accordingly, although they are suitable as metal coatings, they require modification for automotive underbody use.

EXAMPLES 4 TO 9

The following compositions were applied in the same way as the preceding ones.

|  | Ex. 4 | Ex. 5 | Ex. 6 | Ex. 7 | Ex. 8 | Ex. 9 |
|---|---|---|---|---|---|---|
| Product from Ex. A (parts) | 100 | 100 | 100 | 100 | 100 | 100 |
| OULATAC 105 (parts) | 52 | — | — | — | — | — |
| Neocryl B731 (parts) | 17 | 8 | 10 | 16 | 24 | 32 |
| Solvesso 100 (parts) | 12 | 4 | — | 4 | 6 | 8 |
| Total solids content (%) | 82 | 78.2 | 81.8 | 80 | 80 | 79.9 |
| Viscosity at 23° C. (Pa s) |  | 2 | 120 | 60 | 400 | 400 |

These coatings were all satisfactory for anti-sagging performance and corrosion protection. All (except Ex. 9) were flexible at −40° C.

EXAMPLES 10 TO 12

The following compositions were applied in the same way as the preceding ones.

|  | Ex. 10 | Ex. 11 | Ex. 12 |
|---|---|---|---|
| Product from Ex. A (parts) | 100 | 100 | 100 |
| OULATAC 105 (parts) | — | — | 8 |
| Neocryl B731 (parts) | 2 | 3 | 2 |
| Terpolymer* (parts) | 2 | 3 | 2 |
| Solvesso 100 (parts) | 8 | 14 | 8 |
| Total solid content (%) | 76.4 | 72 | 78.7 |
| Viscosity at 23° C. (Pa s) | 20 | 45 | 15.4 |

*Ethylene (76%)/Vinyl acetate (17%)/Acrylic acid (7%).

These coatings all had satisfactory anti-sagging and corrosion protection performance.

We claim:
1. A composition comprising:
    (a) an amorphous overbased sulfonate of an alkaline earth metal as a primary essential solid component, said amorphous sulfonate comprising colloidal particles having a particle size of at most 100Å,
    (b) a solvent or plasticizer, and
    (c) a polymeric material soluble in the solvent or compatible with the plasticizer, said composition having a solids content of at least about 70% by weight.
2. A composition as claimed in claim 1, wherein component (a) is or comprises an overbased calcium sulphonate.
3. A composition as claimed in claim 1, having a solids content of up to 85% by weight.
4. A composition as claimed in claim 1 or claim 2, wherein the sulphonate represents from 75 to 99.9% by weight of the solids content, based on the solid components of (a), (b) and (c).
5. A composition as claimed in claim 4, wherein the sulphonate represents from 80 to 99.8% by weight of the solids content, based on the solid components of (a), (b) and (c).
6. A composition as claimed in claim 1 or claim 2, which comprises a solvent, and wherein the solvent is an aliphatic solvent.
7. A composition as claimed in claim 1 or claim 2, wherein the polymeric material is an acrylic resin.
8. A composition as claimed in claim 7, wherein the acrylic resin has a molecular weight within the range of from 50,000 to 150,000 and a glass transition temperature in the range of from 10° C. to 55° C.
9. A composition as claimed in claim 1 or claim 2, wherein the polymeric material is a rosin ester of pentaerythitol, with a melting point within the range of from 105° C. to 140° C.
10. A composition as claimed in claim 1 or claim 2, wherein the polymeric material is an ethylene/vinyl acetate, or an ethylene/acrylic acid, copolymer.
11. A composition as claimed in claim 1 or claim 2, wherein the polymeric material is an ethylene/acrylic acid/vinyl acetate terpolymer.
12. A metal surface having a composition as claimed in claim 1 or claim 2, or the residue of such a composition after removal of solvent, applied thereto.
13. A method of protecting a metal surface from corrosion, which comprises applying to the surface to be protected a corrosion protection coating composition as set forth in any one of claims 1 or 2.

* * * * *